Nov. 28, 1967 — D. P. WORDEN ETAL — 3,355,567
SLANTED COUPLER FOR TUBE WELDING
Filed Jan. 23, 1967
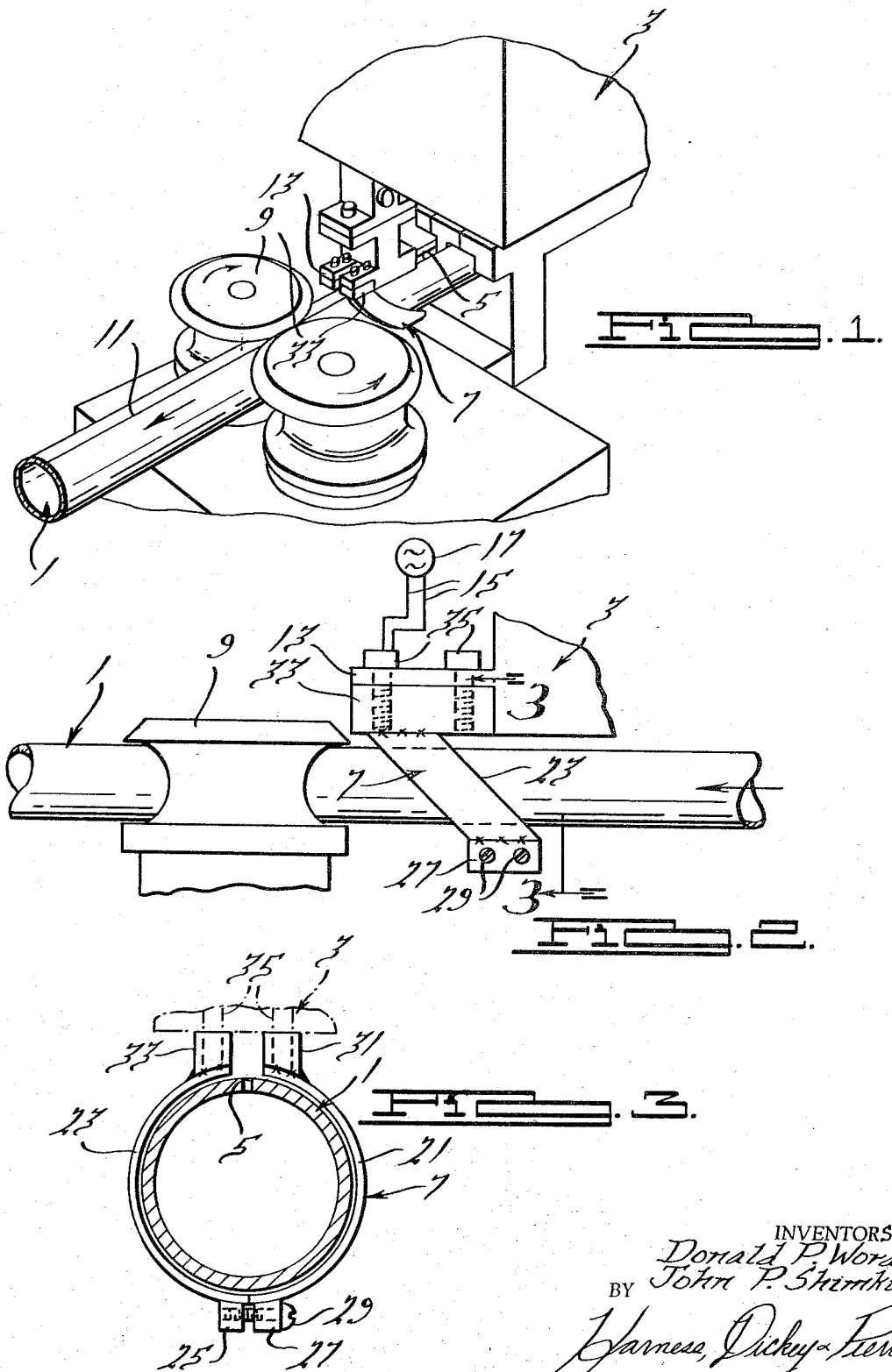
INVENTORS.
Donald P. Worden,
BY John P. Shimkus
Harness, Dickey & Pierce
ATTORNEYS

United States Patent Office 3,355,567
Patented Nov. 28, 1967

3,355,567
SLANTED COUPLER FOR TUBE WELDING
Donald P. Worden and John P. Shimkus, Racine, Wis.,
assignors to Walker Manufacturing Company, Racine,
Wis., a corporation of Delaware
Filed Jan. 23, 1967, Ser. No. 610,965
11 Claims. (Cl. 219—8.5)

ABSTRACT OF THE DISCLOSURE

A coupling device for inducing current in the edges of a metal strip being formed into seam welded tubing comprising a pair of simple conductive straps disposed at an angle of preferably 42 degrees to the axis of the tubing being formed.

Background of the invention

Apparatus is known for producing seam welded metal tubing in which a strip of metal (normally furnished in the form of a steel coil) is passed through a series of rolls which transform it into a C-shape with the opposite edges closely facing each other across a V-shaped gap. A single or multiple turn high frequency alternating current induction coil around the tube in advance of the weld point, which is at or adjacent the apex of the V-gap, induces electrical current in the metal which tends to concentrate at the seam edges to heat them to a temperature that enables them to be welded together upon the application of suitable pressure to bring the edges into contact with each other. U.S. Patents 2,687,464, 2,817,-364, 3,037,105, and 3,127,674 show various equipment for the formation of tubing by induction welding.

In the design of this equipment one of the important objects is to keep the electrical power consumption as low as possible while still enabling high quality tubing to be manufactured at a high rate of speed. U.S. Patent 3,037,105, for example, discloses the use of magnetic cores or impeders for this purpose. It is likewise an object of the present invention to reduce the electrical power required to produce high quality, high speed tubing, and also to reduce the cost of the means of imparting power to the tubing to be welded. It is a further object of the invention to simplify the structure of the induction coil by providing one which does not require internal circulation of coolant, and other expensive appendages.

Brief summary of the invention

The invention provides a coupling device configuration which produces a magnetic field that is oriented differently, with respect to the tubing than has been the magnetic field produced by coils of the prior art. In the past the plane of the coil, whether of one or more turns, intersects the tubing at substantially right angles and, accordingly, the magnetic field produced could be described as substantially symmetrical with respect to a plane normal to the tubing axis and containing a turn of the coil. In contrast, in a coupler according to the present invention, the turn defines a plane that intersects the tubing at an acute angle (preferably about 42° to the axis of the tubing) and therefore produces a magnetic field which is substantially asymmetric with respect to a plane normal to the tubing. This disposition of the magnetic field produces a more efficient current flow in the tubing and less induction of the coupler itself and therefore reduces electrical losses and power consumption.

Description of the drawings

FIGURE 1 is a perspective view of an induction tube welder embodying the invention;

FIG. 2 is a side view on a slightly enlarged scale of the welder of FIG. 1; and

FIG. 3 is a cross section along the line 3—3 of FIGURE 2.

Description of the preferred embodiment

As seen best in FIGS. 1 and 3, a piece of originally flat sheet metal has been rolled into a tube 1 and fed in the direction of the arrow by roll forming equipment that is not shown in the drawings but which is known to those skilled in the art. It passes through the welder 3 where the opposite edges of the gap 5 in the tube wall (as aligned by the seam guide 6) are heated in the area of the coupler 7 and then pressed and welded together by the pressure rolls 9 to form the seam weld 11 in the tube. The tube 1 follows a fixed, predetermined path as it moves in the direction of the arrows in passing through the forming and welding equipment.

The coupler 7 is rigidly secured to and supported by a flange 13 which forms a part of the frame of the welding equipment 3 and is connected by means of suitable electrical conduits 15 to a suitable source of alternating radio frequency current from an oscillator converter system or the like, such current preferably having a frequency in the range of 300,000 to 500,000 cycles. Preferably, a magnetic impeder (not shown) is disposed inside the tube adjacent the coupler 7 as is known in this art. (See U.S. Patent 3,037,105.)

The coupler 7 is in the form of a narrow, slanted copper sleeve and includes opposite side sections 21 and 23 which may be cut out of a copper tube. Welded to the bottom of the sections 21 and 23 are copper blocks 25 and 27 and these are secured to each other by means of the screws 29 to serve as a clamp and hold the opposite sides of the coupler together. Copper blocks 31 and 33 are welded to the top ends of the sides 21 and 23 and these are tapped to receive the bolts 35 whereby the coupler is tightly clamped to the arm 15 of the welding equipment 3. The blocks 31 and 33 also serve as a means for electrical connection of the opposite sides of the coupler to the source of radio frequency 17. It will be noted that there is an air gap between the blocks since the block 31 is spaced from the block 33 as are the top ends of the coupler sides 21 and 23 and that this gap is aligned with and over the gap 5 in the tubing 1 when the coupler 7 is mounted in its operative position as seen in FIG. 1. It will be noted that the sides 21 and 23 of the coupler 7 are not hollow but are merely strap-like pieces of copper and that the blocks 31 and 33 and 25 and 27 are likewise solid pieces of copper. It has been found that it is not necessary to make them hollow to provide for internal cooling.

In accordance with the invention, a transverse plane defined by the sides of the coupler 7 is slanted with respect to coupler axis or the tube 1 and makes an angle of preferably about 42° to such axis and/or the length of the tube 1. The coupler 7 is disposed so that the portion thereof located adjacent to the gap 5 (that is, the edges to be heated to welding temperature) is located in the downstream direction whereas the bottom portion of the coupler remote from the gap is located in the upstream direction. Preferably the upstream and downstream sides of the straps are parallel as shown as non-parallel sides tend to burn out or reduce power efficiency or weld quality. The width of the straps is important and is related to tube diameter; the ratio of tube diameter to strap width being about 1.65 to 1. If the strap is narrower the coupler tends to burn out and if it is wider the efficiency drops abruptly. For a 2½" diameter tube the strap width is preferably 1½".

It is believed that the slanted arrangement of the coupler 7 produces a magnetic field paralleling its shape which is asymmetrical with respect to an intersecting plane perpendicular to the tubing. This produces additive circulating current about the tubing, reduces the magnetic induction of the coupler 7, and therefore permits more efficient utilization of the radio frequency power supplied by the unit 17. The fact that it is not necessary to internally cool the coupler by means of a liquid coolant is an indication that its efficiency is materially greater than that of coils previously used. To illustrate, in making 2″ O.D. tubing from .056″ hot rolled steel strip a welder using a standard coil of the prior art required 192.5 kilowatts of power input to the high frequency unit at a rate of feet of tubing of 260 feet per minute whereas the coupler of this invention required only 150.65 kilowatts at the same speed. Accordingly, the speed was increased to 310 feet per minute with the present invention and the power input was 178.25 kilowatts resulting in a significant power saving while obtaining an increased production rate.

The coupler 7 is made of thin walled copper tubing and the top and bottom connector blocks are welded to the sides 21 and 23, as indicated above. This method in making the couplers saves considerable expense and reduces electrical losses otherwise encountered in devices serving the same function. Preferably, the confronting faces of the blocks 31 and 33 are provided with a ceramic insulating coating that is about .012″ thick to prevent arcing over and pitting of the blocks and increase their life. Other insulating material having a suitable non-conductive value or suitable total di-electric value may also be used.

Modifications may be made without departing from the spirit and scope of the invention.

We claim:

1. In an induction heater wherein opposite edges of a metal strip are welded together to form tubing of a predetermined diameter as it is moved in one longitudinal direction along a fixed predetermined path extending axially of the tubing, said heater including a frame and a source of radio frequency oscillating electrical current, the improvement comprising a single loop coupler connected to said source and supported on said frame at a longitudinal portion where said tubing edges are separated from each other by a gap so that said tubing passes through the coupler and current is induced in the metal to heat said edges on opposite sides of the gap to welding temperature, said coupler loop comprising a pair only of substantially parallel arms each enveloping substantially one half the circumference of the tubing and extending at an acute angle to the path of the tubing with the portion of the coupler loop adjacent said edges being substantially farther downstream than the portion of the coupler diametrically opposite to said edges, said arms being spaced apart adjacent an end thereof to provide a non-conductive gap in said loop adjacent to the gap between said metal edges.

2. The invention as set forth in claim 1 wherein said arms are a pair of narrow solid metal straps.

3. The invention as set forth in claim 2 wherein the ratio of said predetermined tubing diameter to the width of said straps is about 1.65 to 1.

4. A coupling device for inducing current in a member inserted therein, comprising a conductive body forming a single loop having an opening through it to receive a member, said opening having an axis and said body having an annular loop-like wall of substantially constant width in the direction of said axis and defining said opening, opposite sides of said annular wall on opposite sides of said axis defining a plane that makes an acute angle with said axis.

5. A coupler as set forth in claim 4 wherein said acute angle is approximately 42°.

6. A coupler as set forth in claim 4 wherein said annular wall comprises a pair of solid copper straps located respectively on opposite sides of said axis.

7. A coupler as set forth in claim 6 wherein straps are of substantially uniform width and substantially identical width and thickness and are in substantial transverse alignment.

8. A coupler as set forth in claim 7 wherein the ratio of the diameter of the member to the width of the straps is about 1.65 to 1.

9. A coupler as set forth in claim 7 wherein said straps have spaced apart end portions and including a pair of connector blocks secured respectively to said end portions.

10. A coupler as set forth in claim 9 wherein the mutually confronting portions of said blocks have an electrically insulative coating thereon.

11. A coupler as set forth in claim 10 wherein said coating is ceramic.

References Cited

UNITED STATES PATENTS

| | | | |
|---|---|---|---|
| 1,948,154 | 2/1934 | Adams | 219—8.5 |
| 2,632,092 | 3/1953 | Cachat et al. | 219—8.5 |

RICHARD M. WOOD, *Primary Examiner*.